United States Patent [19]
Krisvoshlykov et al.

[11] Patent Number: 5,488,506
[45] Date of Patent: Jan. 30, 1996

[54] ENHANCED POWER FIBER LASER WITH CONTROLLABLE OUTPUT BEAM

[75] Inventors: Sergej G. Krisvoshlykov, Moscow, Russian Federation; Wolfgang Neuberger, Monchen-Gladbach, Germany

[73] Assignee: CeramOptec Industries, Inc., East Longmeadow, Mass.

[21] Appl. No.: 257,547

[22] Filed: Jun. 9, 1994

[51] Int. Cl.⁶ ........................................... H01S 3/098
[52] U.S. Cl. .................. 359/341; 359/134; 359/160; 359/345; 385/28; 385/39; 385/124; 372/6
[58] Field of Search ..................... 359/134, 160, 359/341, 345; 385/28, 39, 124; 372/6, 71

[56] References Cited

U.S. PATENT DOCUMENTS 4,815,079   3/1989   Switzer et al. ..................... 359/341

FOREIGN PATENT DOCUMENTS 2216111   8/1990   Japan.

OTHER PUBLICATIONS

Giles et al., SPIE vol. 1789, Fiber Laser Sources and Amplifiers IV, 1992, pp. 137–139.
Mironou et al, Lau. J. Quent. Elct. vol. 8, #6, pp. 705–708, Jun. 1978; abst. only provided.
Stearns et al, J. of Lightwave Tech., vol. LT–2, #4, Aug. 1984, pp. 358–362.
Dubois et al, Opt. Lett., vol. 19, #7, pp. 433–435, Apr. 1, 1994; abst. only herewith.

*Primary Examiner*—Nelson Moskowitz
*Attorney, Agent, or Firm*—Bolesh J. Skutnik

[57] ABSTRACT

The present invention is directed at an all-fiber amplifier and laser which use an active multimode graded index fiber. In the amplifier, the active fiber is a multimode graded-index fiber having an axis and a length L. The length L is longer than the distance an input beam (from an input fiber) requires to relax into a stationary state of propagation along the axis of the active fiber. The active fiber is optically connected to an input and output fibers such that the input beam couples to the active fiber at a certain distance from the axis and that the axis of the output fiber coincides with the axis of active fiber. In a laser configuration, the active fiber has a complex gradient parameter g described by the gradient function:

$$g = g_r - ig_i = \omega/n_0$$

wherein $\omega$ is the amplification gradient and equals $(2n_0(n_0 - n_{cl}))^{1/2}$. The parameter g depends upon a propagation distance z and is described by the periodic function:

$$g^2(z) = g^2(1 + 4h \cos 2g_r z), \; h < 1 g_i < g_r$$

wherein parameter h represents the amplitude of modulation of the output beam. The output beam has a period of modulation $\Lambda$ equal to $\pi/g_r$ and to one half of the oscillation period of the output beam. The parameter h is chosen to guide only one quasimode in the active fiber.

14 Claims, 2 Drawing Sheets

ENHANCED POWER FIBER LASER WITH CONTROLLABLE OUTPUT BEAM

BACKGROUND OF THE INVENTION

1. Field of the Invention

The invention relates generally to an optical fiber coherent radiation source, and more specifically to an active multimode graded index fiber laser used to generate an optical signal in optical fiber communication systems, sensors and other optical fiber devices for technical and medical applications.

2. Prior Art Statement

Optical fiber lasers are becoming important components of optical fiber communication systems sensors, fiber-gyros and other optical fiber devices for different technical and medical applications. These lasers essentially consist of a rare-earth-doped optical fiber pumped with an external light source such as a single-mode semiconductor laser or diode-laser array. Mirrors can be used to provide the system with the necessary feedback.

Most fiber lasers are based on conventional high-purity silica-based optical fibers produced by chemical-vapor-deposition and are doped, for example, with such rare-earth elements as $Nd^{3+}$, $Er^{3+}$, $Tm^{3+}$, $Ho^{3+}$, $Yb^{3+}$, $Sm^{3+}$ and $Pr^{3+}$ via gas-phase or solution-doping processes. Other types of fiber lasers include multicomponent high-gain glass fiber lasers fabricated by the rod-intube method or fiber lasers in fluoride based glasses. A single-mode optical fiber with rare-earth doped active core having a diameter between 3 and 8 um is typically used in fiber lasers because it can easily be integrated into single-mode fiber-communication and sensor networks. The pump light from high-power semiconductor sources (such as diode-laser arrays) couples into a highly multimode undoped cladding region which guides the pump radiation by virtue of its lower refractive index. Amplification of the light takes place only in a single-mode rare-earth-doped core while a portion of the mode field propagates in the passive cladding region. Different types of fiber laser cavity configurations may be used including a fiber directly coupled to dichroic mirrors (such as bulk optical elements or coatings deposited directly on the fiber end face) and an all-fiber laser cavity design employing fiber-loop mirrors.

Fiber lasers offer several advantages over traditional lasers. These advantages include the high pumping intensity available as a consequence of the good field confinement over a large length in the fiber. Additionally, because these lasers comprise a fiber, they have good compatibility with fiber-communication and sensor networks. The nature of rare-earth doping levels also allows output tunability over a broad range and a wide choice of pump wavelength-division multiplexing. Wide gain bandwidth makes rare-earth-doped fibers very attractive for use as optical amplifiers, especially for wavelength-division multiplexing applications. Moreover, spectral output of the fiber lasers is relatively insensitive to temperature changes compared to semiconductor-based sources and the small fiber cross section allows operation without special cooling.

The primary disadvantage of single-mode fiber lasers is the difficulty of coupling the pump light from diode laser arrays into the fiber. Even using a diffraction-limited semiconductor laser as the pump source fails to alleviate the problem due to the laser's low output power. The problem of coupling pump light into an active fiber can be solved, however, by using larger core diameters, i.e. multimode fiber lasers. Such multimode fiber lasers are much more powerful because of the more efficient pumping of the active core and more efficient utilization of the pump power. The mirror-coating-damage problem can be solved as well by using larger core diameters as found in multimode active fibers.

SUMMARY OF THE INVENTION

The present invention is directed at an all-fiber amplifier and laser which use an active multimode graded index fiber. The active fiber is a multimode graded-index fiber having an axis and a length L. In the amplifier, the length L is longer than the distance an input beam (from an input fiber) requires to relax into a stationary state of propagation along the axis of the active fiber. The active fiber is optically connected to an input and output fibers such that the input beam couples to the active fiber at a certain distance from the axis and that the axis of the output fiber coincides with the axis of active fiber. In a laser configuration, the active fiber has a complex gradient parameter g described by the gradient function:

$$g = g_r - i g_i = \omega/n_0$$

wherein $\omega$ is the amplification gradient and equals $(2n_0(n_0 - n_{cl}))^{1/2}$. The parameter g depends upon a propagation distance z and is described by the periodic function:

$$g^2(z) = g_r^2(1 + 4h \cos 2g_r z), \quad h < 1, g_i < g_r$$

wherein parameter h represents the amplitude of modulation of the output beam. The output beam has a period of modulation $\Lambda$ equal to $\pi/g_r$ and to one half of the oscillation period of the output beam. The parameter h is chosen to guide only one quasimode in the active fiber.

BRIEF DESCRIPTION OF THE DRAWINGS

The present invention, its advantages and objects will be more fully understood when specification herein is taken in conjunction with the appended drawings hereto, wherein.

DESCRIPTION OF THE INVENTION

A multimode active fiber is the principal element of a fiber laser. To maximize both the gain factor and the coupling efficiency between the pump beam and the active fiber core, the core radius of the active fiber should be maximized. However, the core radius must be restricted to enable the fiber laser to operate without additional cooling.

Figure 1:
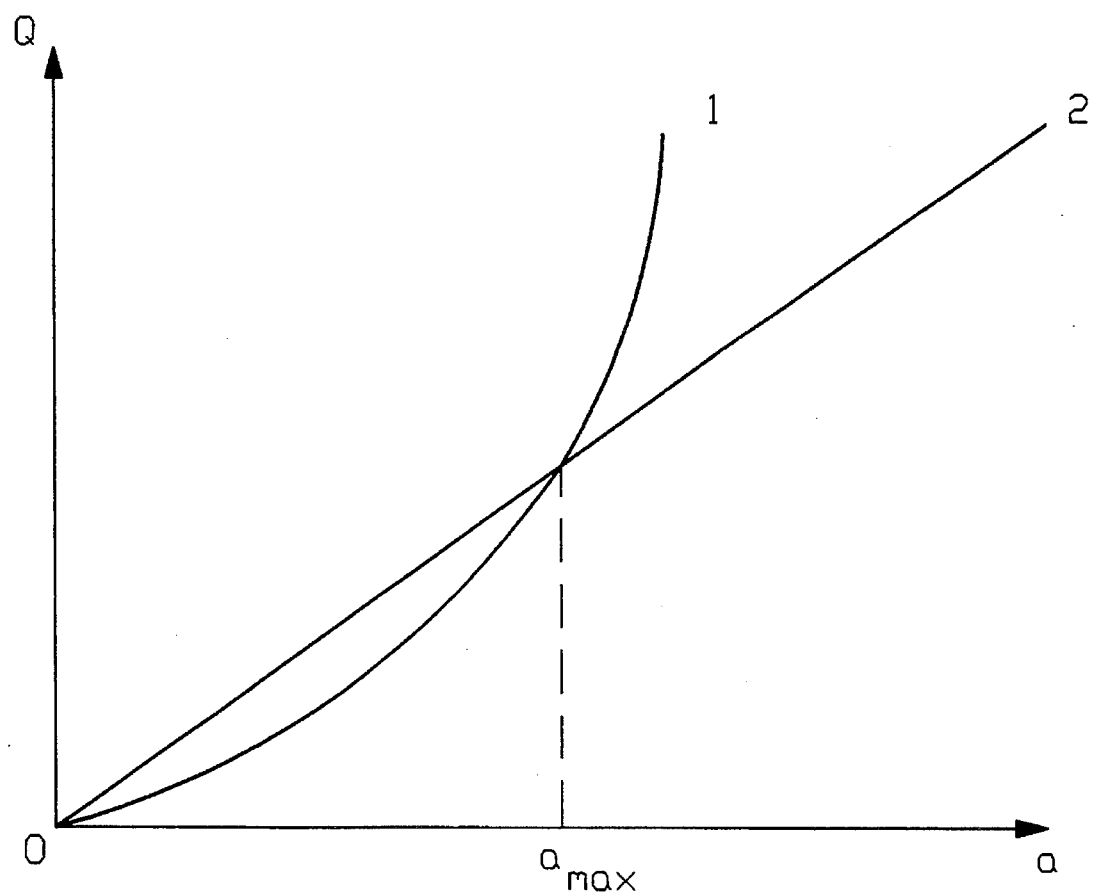
FIG. 1 illustrates how the maximum fiber core radius is determined.

The intensity Q of the heat energy generated in the fiber core of radius a is proportional to $a^2$. Intensity Q is represented in FIG. 1 as curve 1. Curve 2 in FIG. 1 shows the heat intensity conducted and irradiated from the fiber surface as a function of a. These curves depend on the specific fiber material, the fiber's geometry and the maximum permitted fiber temperature. Once these curves are known, the maximum possible core radius is determined by the intersection of the two curves. To provide a high quality output beam field, the active fiber must be selected such that a phasing of all amplified guided modes occurs. Such phasing automatically occurs in an active multimode graded-index fiber with a sufficiently large length because of the gain guiding properties of the fiber. Multimode graded index fibers are known to exist as described in German Patent No. 0 438 653 A2. This patent is incorporated as referenced herein but is not intended to limit the grading of the fiber of the present invention. The active graded index fibers may be similarly manufactured using various materials depending on the specific applications. For instance, the present invention may be a silica-based fiber in which the real index gradient is produced using an appropriate dopant (e.g., Ge-doped fibers) and the amplification in the fiber is produced using rare-earth dopants. It is convenient to approximate a refractive index distribution in a core of the graded-index fiber by the following parabolic-index profile:

$$n^2(r) = n_0^2 - \omega^2 r^2, 0 < r \leq a \quad (1)$$
$$n^2(r) = n_0^2 - \omega^2 a^2 = n_{cl}^2; r \geq a$$

wherein $r$ is a transverse coordinate; $n_0$ is the refractive index at the fiber axis($r=0$); $n_{cl}$ is the refractive index of the fiber cladding; and gradient parameter $\omega$ characterizes the gradient of the index profile.

The gradient parameter $\omega$ of a standard parabolic index fiber can be calculated as follows:

$$\omega = \frac{[(n_0^2 - n^2(a)]^{1/2}}{a} \approx \frac{[2n_0\Delta n]^{1/2}}{a} \quad (2)$$

wherein $\Delta n$ is the difference between the core and cladding refractive indices. In the case of active graded-index fibers, the refractive index $n$ and the gradient parameter $\omega$ are complex numbers. The real parts of these numbers describe index guiding properties of the fiber, and the imaginary parts characterize the amplification in the fiber.

Therefore, the amplification of each Gauss-Laguerre mode guided in the active waveguide of profile (1) is characterized by the imaginary part of the complex mode propagation constant. The magnitude of the amplification is referred to as the gain factor. The gain factor of the mode is given by the following expression:

$$\chi = \exp[2kn_{0r}z - 2g_i(v+1)z] \quad (3)$$

wherein amplification magnitude $g$ equals $g_r - ig_i = \omega/n_0\mathbf{1}$; $v$ is the mode index and equals 0, 1, 2...; $z$ is the propagation distance; and $k$ is a constant and equals $2\pi/\Lambda$ wherein $\Lambda$ is the wavelength. The imaginary part on the refractive index $n_o$ characterizes the gain factor common for all the guided modes. Because of the more efficient coupling of the pump beam to the fiber core the gain factor can be much larger in a multimode active fiber than in a single-mode fiber. The imaginary part of the parameter $g$ characterizes the gain guiding properties of the fiber. The gain guiding properties for various modes are different, and the lower order modes exhibit larger gain than the higher order modes. As a result, any incoming beam after propagating a sufficiently large distance $z$ ($z > 1/g_i$) in the active fiber relaxes to some stationary state of propagation along the axis of the fiber. This stationary state is described by a Gaussian beam having the width $\sigma = (2k\omega_i)^{-1/2}$ and a spherical wavefront of radius $\rho = 1/\omega_i$. In this state, the beam can be coupled with high efficiency to a single-mode fiber using an appropriate gradient lens or taper.

The imaginary part of gradient $\omega_i$ depends on both a distribution of the rare-earth dopant and a distribution of the intensity of a pump beam over the cross section of the fiber core. If an active graded-index fiber is pumped through its end face with a diffused Lambertian source (light emitting diode, flashlamp etc.) the intensity distribution of the pumping beam in the fiber core describes the transverse variation of the real part of the refractive index distribution. Therefore, the gradient of gain $\omega_i$ usually appears in a graded-index waveguide, even in the case when the waveguide has a uniform distribution of the rare-earth dopant over its cross section. It should be noted, however, that the gain guiding properties also occur in an active graded-index waveguide with $\omega_r=0$. In this case, the parameter $g_i$ responsible for this property is equal to $\omega_i n_{or}/|n_0|^2$.

Figure 2:
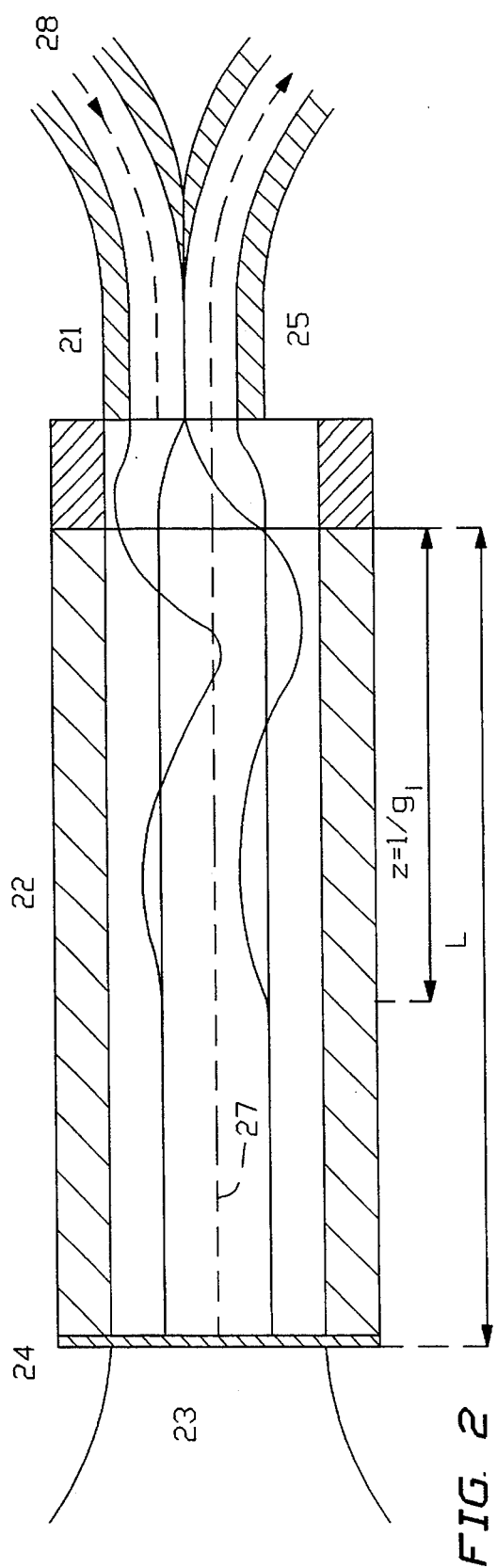
FIG. 2 schematically shows a fiber amplifier based on an active multimode graded-index fiber.

A fiber amplifier is represented schematically in FIG. 2. An input beam 28 from an input single-mode fiber 21 is coupled to an active multimode graded-index fiber 22. The active fiber 22 is pumped by a diode laser beam 23 through its end face and/or side surface. The input beam 28 shifts with respect to the axis 27 of active fiber 22 and thereby excites a large number of modes in the active fiber which amplifies input beam 28. After propagating in the active fiber for a length $L \geq 1/g_i$, the input beam 28 relaxes to a Gaussian beam which propagates in a stationary state along the fiber axis 27. The input beam reflects from a dichroic mirror coating 24 deposited on the fiber end face, and couples to an output single-mode fiber 25 using an appropriate graded-index lens 26. Lens 26 can be fabricated as a section of another graded-index fiber of appropriate length. An optical connection of the input and output single-mode fibers 21 and 25 with the active multimode fiber 22 through the gradient lens 26 can be conveniently realized by attaching them to a silicon block using well developed silicon V-groove technology.

An active multimode graded-index fiber laser is created by using two mirrors in the fiber as feedback. Such a fiber laser is more powerful than a standard single-mode fiber laser and generates a large number of modes. The superposition of these modes, however, creates a complicated spatial pattern which lowers the coupling efficiency of the beam to a single-mode output fiber. Therefore, to benefit from the active multimode graded-index fiber laser, all the modes generated must be phased such that the superposition of their fields forms an output beam with good spatial quality. To this end, phasing of all modes can be realized in an active fiber with large-scale periodic inhomogeneity relative to wavelength.

This relationship can be described using several calculations. Consider a periodic multimode parabolic-index active fiber (1) having a complex parameter $g$ equal to $\omega/n_0$ which has a period of $\Lambda = \pi/g_r = T/2$ and a periodic function as follows:

$$g^2(z) = g^2(1 + 4h \cos[2g_r z]), h < 1 g_i < g_r \quad (4)$$

wherein $z$ represents the longitudinal coordinate; $T$ is a period of ray oscillation in a standard uniform fiber (1) and equals $2\pi/g_r$; and parameter $h$ characterizes the amplitude of modulation of parameter $g$. New types of Gauss-Laguerre modes, herein referred to as quasimodes, occur in the periodic fiber of profile (4) rather than the standard modes that propagate in a uniform fiber of profile (1). These quasimodes are represented by oscillating beams whose fields reconstruct themselves periodically until reaching a complex phase factor as follows:

$$E(r,z + \Lambda) = \exp(i\beta_v \Lambda) E_v(r,z) \quad (5)$$

wherein $\beta_v$ is a complex quasimode propagation constant; and $v$ is a complex quasimode propagation constant:; $E_v(r,z)$ is a periodic function with period $\Lambda$; and $v$ is the mode index. In periodic fibers, such quasimodes and their corresponding quasimode propagation constants behave the same as the standard modes and propagation constants behave in uniform fibers. However, in contrast to standard modes that depend only on the complex refractive index profile, the fields of quasimodes also depend on the period and functional form of the longitudinal periodicity. This dependency allows the quasimodes to be controlled.

It is possible to show mathematically that in the most important case—that is when $n_{0r}/n_{0r} < 1$ and $h > g_i/g_r$—the squared width of the Gaussian fundamental quasimode (v=0) is as follows:

$$\sigma_{xo}^2 = \qquad (6)$$

$$\sigma_o^2 \left[ 1 + (g_r^2/g_i^2)h^2 \right]^{1/2} \left[ 1 - \left( 1 - \frac{1}{1 + g_i^2/g_r^2 h^2} \right)^{1/2} \cos 2g_r z \right]$$

$$\sigma_o^2 = (\tfrac{1}{2} k g_r n_{0r})$$

$$\sigma_o^2 = (\tfrac{1}{2} k g_r n_{0r}) \qquad (6)$$

wherein $\sigma_0$— is the width of the fundamental mode in a uniform active parabolic-index fiber of profile (1). The squared width of the fundamental quasimode averaged over its oscillation period $\Lambda$ is as follows:

$$\bar{\sigma}_{xo}^2 = \sigma_o^2 [1 + (g_r^2/g_i^2) h^2]^{1/2}; \qquad (7)$$

Therefore, the oscillation amplitude of the mode's field can be effectively controlled by varying parameter h. In particular, if $g_r^2/g_i^2) h^2 > 1$, the oscillation amplitude of the fundamental quasimode approximates the fiber core radius a. Because the width of a mode increases with the mode index v, it stands to reason that only a single fundamental Gaussian quasimode with good spatial quality is generated in a multimode fiber laser. Moreover, according to (6) both the width of the output Gaussian laser beam, which corresponds to this quasimode, and the directional pattern of the laser beam can be controlled by varying parameter h. In this way, the width and the directional pattern can be matched to a particular single-mode output fiber.

A periodic variation (4) of the parameter g(z) in the active fiber can be produced by modulating the fiber radius during fiber drawing. The relation between a fiber's core radius and its gradient parameters is given by expression (2). The period of such a modulation $\Lambda$ depends on the fiber gradient parameter which is about 1–2 mm for a typical graded-index fiber. To tune the quasimode properties, the modulation parameter h can further varied either by using an acoustic wave propagating along the fiber or by using an array of laser diodes spaced at a distance of $\Lambda$ along the length of the active fiber. The array of laser diodes periodically pump the fiber perpendicular to its axis to create a modulation in amplification having a period $\Lambda$. Thus, by modifying parameter h, the width and directional pattern of the output laser beam can be controlled to match the output laser beam to an output fiber mode.

Figure 3:
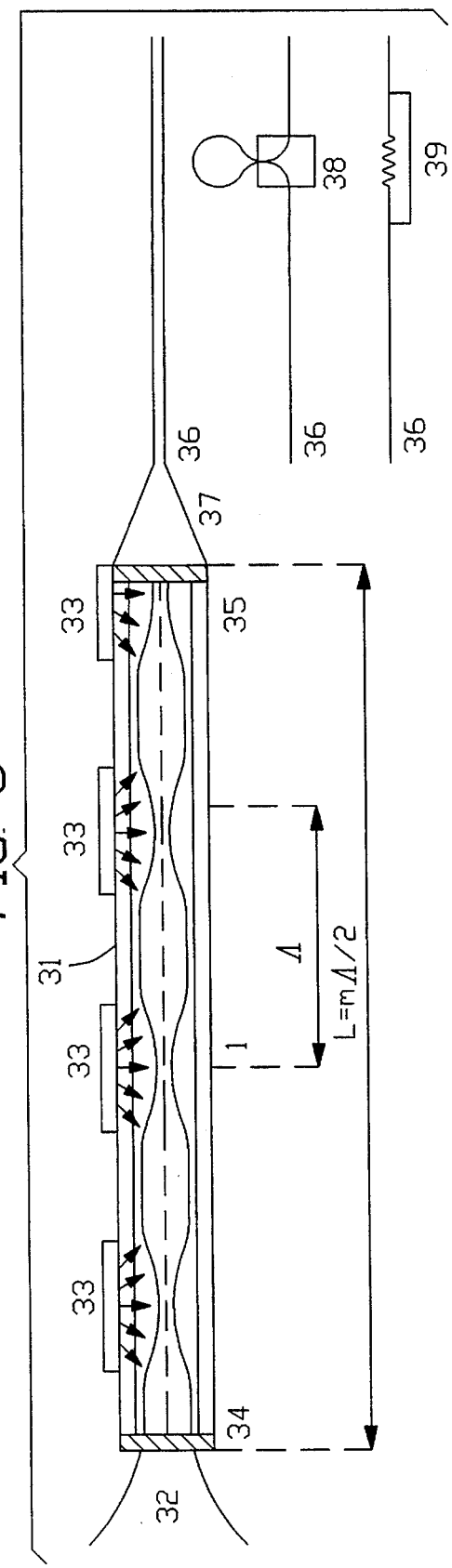
FIG. 3 schematically illustrates a fiber laser based on an active multimode parabolic-index fiber with large-scale periodicity.

A laser for generating only a single quasimode is shown schematically in FIG. 3. A periodic active multimode graded-index fiber 31 has a length L which equals $m\Lambda/2$ wherein m is an integer much greater than one. A diode laser beam 32 pumps fiber 31 through its end face. Additionally, a periodic array of laser diodes 33 with a spacing $\Lambda$ creates a spatially periodic variation of the gain in fiber 31. Feedback in the system is provided using multiple reflections from mirrors 34 and 35 which are deposited on the end faces of fiber 31. The generated quasimode beam is coupled either directly to the output single-mode fiber 36 or through a fiber taper or gradient lens 37.

It may be more convenient to use an all-fiber mirror fabricated in the core of output fiber 36 instead of the mirror coating 35. The all-fiber mirror has several preferred embodiments such as a fiber-loop mirror 38 or a Braggs gratings 39. The Braggs grating 39 can be formed several ways. For example, it can be optically written directly in the fiber core by holographically writing periodic Ge-0 defects in the glass with a UV laser beam. Alternatively, grating 39 can be produced on the surface of the fiber core after polishing the fiber cladding down to the core in a fiber block.

For the effective control and an automatic adjustment of the system, a feedback mechanism may be employed. A preferred embodiment of the feedback mechanism is based on the known correlation between the output beam parameters and the pump current (i.e., the electrical current used to energize the array of pumping laser diodes). This correlation can be determined, for example, by measuring the output pattern as a function of pump current. Using this correlation, it is possible to automatically adjust the output beam width and the beam directional pattern via the pumping current.

Obviously, numerous modifications and variations of the present invention are possible in light of the above teachings. It is therefore understood that within the scope of the appended claims, the invention may be practiced otherwise than as specifically described herein.

What is claimed is:

1. An active graded-index fiber for use in a fiber laser having a controllable output beam, said fiber having an axis, a core of radius a, and a cladding, said active fiber has a complex refractive index distribution described by the refractive index distribution function:

$$n^2(r) = n^{o2} - \omega^2(z) r^2; \ 0 \leq r < a$$

$$n^2(r) = n_o^2 - \omega^2 a^2 = n_{cl}^2; \ r \geq a$$

wherein r represents the distance from the said axis, $n_o$ represents the refractive index at said axis, and $n_{cl}$ denotes the refractive index of said cladding, said active fiber has a complex gradient parameter g described by the gradient function:

$$g = g_r - i g_i = w/n_o$$

wherein $\omega$ is the amplification gradient and equals $(2n_o(n_o - n_{cl}))^{1/2}$, said parameter g depends upon a propagation distance z and is described by the periodic function:

$$g^2(z) = g^2(1 + 4h \cos 2g_r z); \ h < 1, \ g_i < g_r$$

wherein parameter h represents the amplitude of modulation of said output beam, said output beam has a period of modulation $\Lambda$ equal to $\pi/g_r$ and to one half of the oscillation of said output beam, said parameter h is chosen to guide only one guidemode in said active fiber.

2. The active fiber of claim 1, wherein said active fiber has a length L, said length L is a multiple of one half of said period of modulation $\Lambda$.

3. The optical fiber of claim 2, wherein said active fiber is doped with a rare-earth element.

4. The fiber of claim 3 further comprising two feedback mirrors for reflecting light, one mirror is deposited on each end of said active fiber; and an external light source for pumping said fiber with a pumping bean.

5. The optical fiber of claim 4, wherein said external light source comprises an array of laser diodes spaced at a periodicity of said period of modulation $\Lambda$ along said length L of said active fiber, said laser diodes modify parameter h and thus control the width and directional pattern of an output laser beam to match said output laser beam to an output fiber mode.

6. The optical fiber of claim 5 wherein said laser diodes have automatic adjustment to effect an efficient coupling of the output beam to an output fiber.

7. The optical fiber of claim 4, wherein said external light source comprises a laser diode positioned at the end of said active fiber.

8. Enhanced power fiber laser with a controllable output beam, said laser comprises:

a. an periodic active graded-index fiber having an axis, a core of radius a, and a cladding, said active fiber has a complex refractive index distribution described by the function $$n^2(r)=n_o^2-\omega^2(z)r^2;\ 0 \leq r < a$$

$$n^2(r)=n_o^2-\omega^2 a^2=n_{cl}^2;\ r \geq a$$

wherein r represents the distance from the said axis, $n_o$ represents the refractive index at said axis, and $n_{cl}$ denotes the refractive index of said cladding, said active fiber has a complex gradient parameter g described by the gradient function:

$$g=g_r-ig_i=w/n_0$$

wherein ω is the amplification gradient and equals $(2n_o(n_o-n_{cl}))^{1/2}$, said parameter g depends upon a propagation distance z and is described by the periodic function:

$$g^2(z)=g^2(1+4h\cos 2g_r z);\ h<1 g_i<g_r$$

wherein parameter h represents the amplitude of modulation of said output beam, said output beam has a period of modulation Λ equal to $\pi/g_r$ and to one half of the oscillation of said output beam, said parameter h is chosen to guide only one guidemode in said active fiber;

b. two feedback mirrors for reflecting light, one mirror is deposited on each end of said active fiber;

c. an external light source for pumping said fiber with a pumping beam; and c. an output fiber optically connected to said active fiber.

9. An optical fiber amplifier comprising:

a. an input monomode fiber for guiding an input beam, said input fiber has an axis;

b. an output monomode fiber for guiding an amplified beam, said output fiber has an axis:

c. an active fiber for amplifying said input beam to produce said amplified beam, said active fiber is a multimode graded-index fiber having an axis and a length L, said length L is longer than the distance said input beam requires to relax into a stationary state of propagation along said axis of said active fiber, said active fiber is optically connected to said input and output fibers such that said input beam couples to said active fiber at a certain distance from said axis and that said axis of said output fiber coincides with said axis of active fiber;

d. an external light source for pumping said fiber with a pumping beam; and e. a fiber taper placed between the active fiber and the output light transmitting fiber in order to improve the coupling efficiency between these fibers.

10. An optical fiber amplifier comprising:

a. an input monomode fiber for guiding an input beam, said input fiber has an axis;

b. an output monomode fiber for guiding an amplified beam, said output fiber has an axis:

c. an active fiber for amplifying said input beam to produce said amplified beam, said active fiber is a multimode graded-index fiber having an axis and a length L, said length L is longer than the distance said input beam requires to relax into a stationary state of propagation along said axis of said active fiber, said active fiber is optically connected to said input and output fibers such that said input beam couples to said active fiber at a certain distance from said axis and that said axis of said output fiber coincides with said axis of active fiber;

d. an external light source for pumping said fiber with a pumping beam; and e. a fiber gradient lens placed between said active fiber and said output light transmitting fiber in order to improve the coupling efficiency between these fibers.

11. The laser of claim 8, wherein said active fiber has a length L, said length L is a multiple of one half of said period of modulation Λ.

12. The laser of claim 11, wherein said active fiber is doped with a rare-earth element.

13. The laser of claim 12, wherein said external light source comprises an array of laser diodes spaced at a periodicity of said period of modulation Λ along said length L of said active fiber, said laser diodes modify parameter h and thus control the width and directional pattern of an output laser beam to match said output laser beam to an output fiber mode.

14. The laser of claim 12, wherein said external light source comprises a laser diode positioned at the end of said active fiber.

* * * * *